United States Patent [19]
Capps et al.

[11] Patent Number: 5,671,438
[45] Date of Patent: *Sep. 23, 1997

[54] METHOD AND APPARATUS FOR FORMATTING PARAGRAPHS

[75] Inventors: Stephen P. Capps; Ernest H. Beernink, both of San Carlos, Calif.

[73] Assignee: Apple Computer, Inc., Cupertino, Calif.

[*] Notice: The term of this patent shall not extend beyond the expiration date of Pat. No. 5,479,596.

[21] Appl. No.: 485,095

[22] Filed: Jun. 7, 1995

Related U.S. Application Data

[63] Continuation of Ser. No. 70,096, May 27, 1993, Pat. No. 5,479,596.

[51] Int. Cl.$^6$ .................... G06T 11/60; G06T 11/80
[52] U.S. Cl. .................... 395/802; 395/804; 345/156; 382/200
[58] Field of Search ........................ 395/144–148, 395/155, 161, 117, 358, 761, 804, 802; 345/156–184; 364/419.17, 419.1, 715.03; 382/173, 200, 181

[56] References Cited

U.S. PATENT DOCUMENTS

| | | | |
|---|---|---|---|
| Re. 34,476 | 12/1993 | Norwood | 382/13 |
| 4,812,832 | 3/1989 | Oishi et al. | 340/709 |
| 5,157,737 | 10/1992 | Sklarew | 382/13 |
| 5,220,649 | 6/1993 | Forcier | 395/148 |
| 5,231,698 | 7/1993 | Forcier | 395/146 |
| 5,237,651 | 8/1993 | Randall | 395/148 |
| 5,276,794 | 1/1994 | Lamb, Jr. | 395/149 |
| 5,347,295 | 9/1994 | Agulnick et al. | 345/156 |
| 5,479,596 | 12/1995 | Capps et al. | 395/148 |
| 5,517,578 | 5/1996 | Altman et al. | 382/181 |

OTHER PUBLICATIONS

O'Connor, Rory J., "Apple Banking on Newton's Brain," San Jose Mercury News, Apr. 22, 1992.
Weiman, Liza et al., "A Step Toward the Future," Macworld, Aug. 1992, pp. 129–131.
Soviero, Marcelle M., "Your World According to Newton," Popular Science, Sep. 1992, pp. 45–49.

*Primary Examiner*—Joseph H. Feild
*Attorney, Agent, or Firm*—Hickman Beyer & Weaver LLP

[57] ABSTRACT

A method for formatting paragraphs on a screen of a computer system including the steps of: a) entering a word on a screen of a computer system using a pointing mechanism; b) finding an associated paragraph, if any, that the word is to be associated with; c) adding the word to the associated paragraph, if one exists; and d) starting a new paragraph with the word if there is not a closely related exiting paragraph. A newly-entered word can be added to an associated paragraph in basically four ways. The word can be added in a new line at the top of the paragraph, in a new line at the bottom of the paragraph, at the end of an existing line, or between words of an existing line. After a word has been entered, the text within the paragraph is repositioned as desired by the user, either implicitly or through an explicit command. For example, the words within a paragraph can be caused to "reflow" so that they are aligned between the left and right margins of the paragraph. Alternatively, the words within the paragraph can be centered or right-justified.

26 Claims, 12 Drawing Sheets

METHOD AND APPARATUS FOR FORMATTING PARAGRAPHS

This is a continuation of application Ser. No. 08/070,096 filed on May 27, 1993, Pat. No. 5,479,596.

BACKGROUND OF THE INVENTION

The present invention relates generally to computer systems, and more particularly to a word processing function for a pen-based computer system.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on screen. With suitable recognition software, text and numeric information can also be entered into the pen-based computer system in a similar fashion.

One of the most desirable functions for a pen-based computer system is the ability to take notes and to serve as a simple word processor. In the past, the entry of text into a pen-based computer system has been severely limited by constraints imposed by the pen-based computer's operating system. For example, text typically has to be entered in small boxes or fields, and usually, the location for insertion of text is specifically identified. The text is then stored as "ink", or is processed by a computer implemented process known as a "word recognizer" to convert the words to recognized text. The ability to edit and reformat text entered into prior art pen-based computer systems is also quite limited.

SUMMARY OF THE INVENTION

The present invention permits the free-form entry of text into a pen-based computer system. As words are added onto the screen of the computer system, they are combined with an associated paragraph, if any. If there is not an associated paragraph, a new paragraph is created for the word. Words can be automatically inserted into a paragraph by overlapping an existing word, and new first and last lines can be added to an associated paragraph by placing the word immediately above or below, respectively, an associated paragraph. The method of the present invention can also cause the words within the paragraph to automatically reflow after a new word is entered, and it can recognize and implement a format type for the paragraph (e.g. centered, right-justified, or left-justified).

A method for formatting paragraphs on the screen of a computer system in accordance with the present invention includes the steps of: a) entering a word on the screen of a computer system using a pointing mechanism; b) finding an associated paragraph, if any, that the word is to be associated with; c) adding the word to the associated paragraph, if one exists; and d) starting a new paragraph with the word if no associated paragraph exists. Preferably, the step of finding an associated paragraph includes comparing a bounding box of the newly-entered word with the bounding boxes of all of the paragraph objects on the screen. The paragraph object overlapped the greatest amount by the newly entered word is considered the associated paragraph. The step of adding a word to an associated paragraph preferably includes determining whether the word overlaps an existing word of the associated paragraph, and adding the word after the existing word that is most overlapped. The step of adding a word to an associated paragraph also preferably comprises the steps of determining whether the word is above or below the associated paragraph, forming a new line either above or below the associated paragraph, respectively, and adding the word to the new line of the paragraph.

After a word has been added to an associated paragraph, text (i.e. all of the words) is preferably repositioned within the associated paragraph in an appropriate manner. For example, if a word is inserted into a line of the associated paragraph such that the right-most end of the line extends past the right margin, words are caused to "reflow" within the associated paragraph so that the lines do not extend beyond the margins. Alternatively, the process of the present invention can determine whether the text of the associated paragraph is a specialized format, e.g. whether the lines of text are centered or right-justified. If the paragraph is of a special format type, the lines within the paragraph are adjusted accordingly.

A major advantage of the present invention is that words can be entered into a pen-based computer system and can be automatically integrated into an associated paragraph. The process of the present invention is also advantageous in that the paragraphs are automatically formatted to reflow words to fit within its margins or a special formatting type.

These and other advantages of the present invention will become apparent upon reading the following detailed descriptions and studying the various figures of the drawings.

DETAILED DESCRIPTION OF THE PREFERRED EMBODIMENTS

The present invention is well suited for pointer based computer systems such as the pen-based, stylus-based and mouse driven systems that are currently popular. For the purposes of illustration, the invention will be described in connection with a pen-based system.

Figure 1:
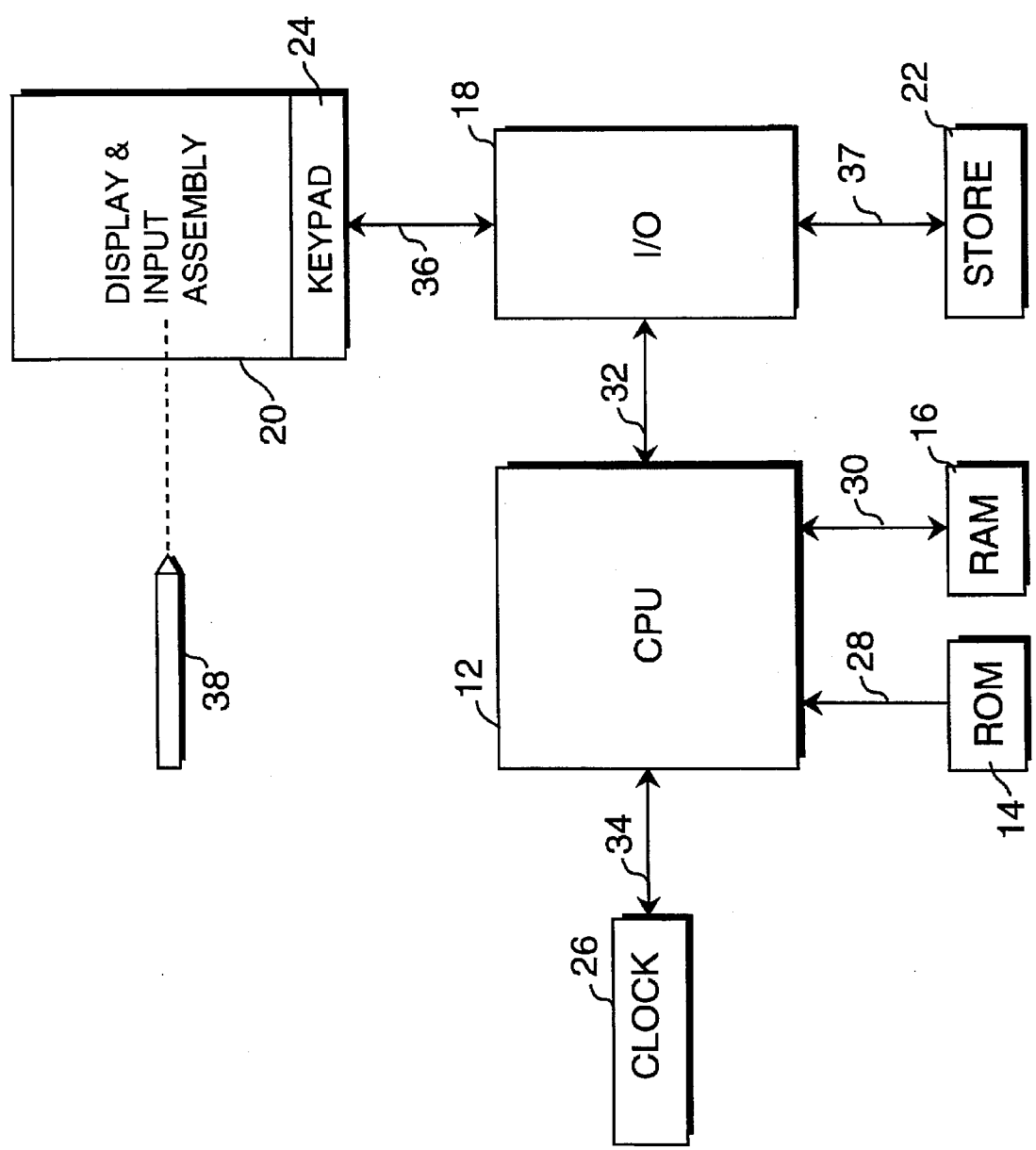
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 preferably comprises a real-time clock to provide real-time information to the system 10. Clock 26 is coupled to CPU 12 by a data bus 34.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. With such a structure, the display assembly 20 can serve as an input "tablet." These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises "button" areas which are associated with the bottom edge of the membrane which covers the LCD display. When the "buttons" are depressed, the membrane senses the pressure and communicates that fact to the CPU 12 via data bus 36 and I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. Mass storage 22 can be coupled to I/O circuitry 18 by a bi-directional data bus 37. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, non-volatile memory such as flash memory, battery backed RAM, PC-data cards, or the like.

In operation, information is input into the pen-based computer system 10 by "writing" on the screen of display assembly 20 with a stylus 38. Information concerning the location of the stylus 38 on the screen of the display assembly 20 is input into the CPU 12 via data bus 36 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
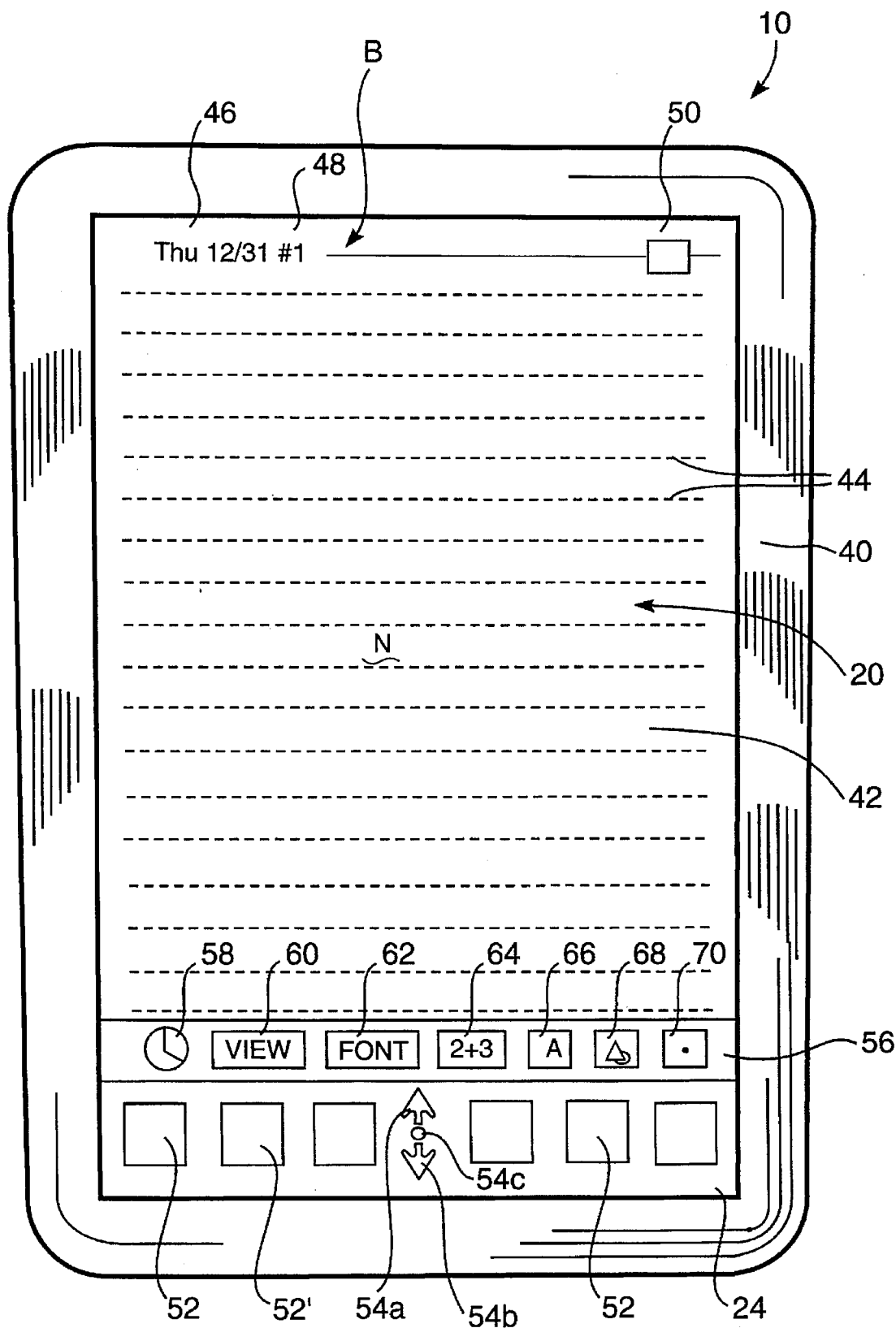
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a header bar B and a number of guidelines 44. The header bar B preferably includes the date of creation 46 of the note N, a note number 48, and a "toolbox" button 50. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" i.e. images generated at convenient locations on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. patent application 07/868,013, filed Apr. 13, 1992 on behalf of Tchao et al., assigned to the assignee of the present invention and incorporated herein by reference in its entirety. In this embodiment, the toolbox button 50 is represented as a "soft button" in the header bar B. However, in alternative embodiments, a physical keypad button could be used in its place.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, run within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, an equations button 64, a text button 66, a graphics button 68, and a nib button 70. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

Figure 3:
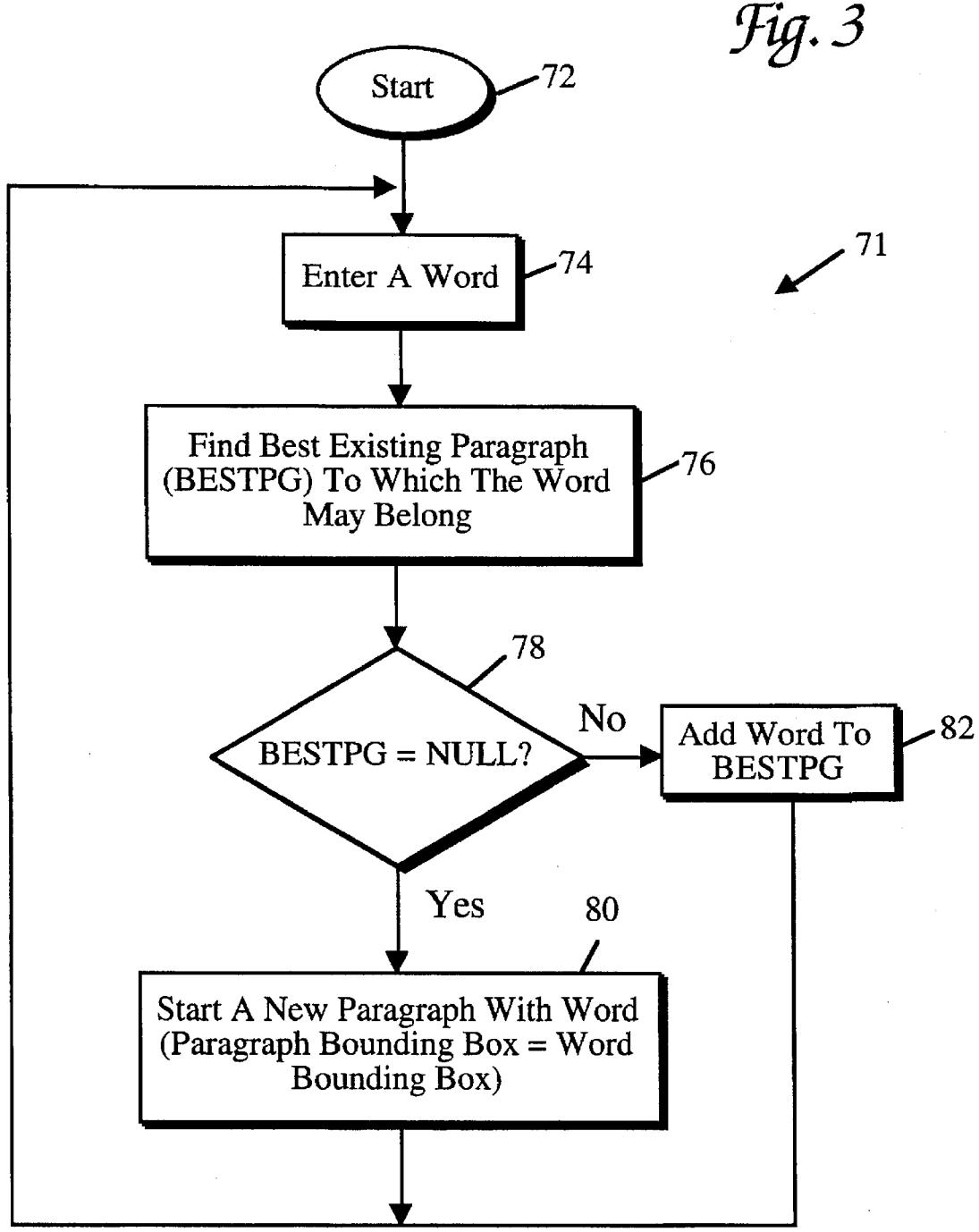
FIG. 3 is a flow diagram illustrating a computer implemented process of the present invention for formatting paragraphs on a pen-based computer system.

In FIG. 3, a computer-implemented process 71 in accordance with the present invention begins at 72 and, in a step 74, a word is entered into the computer system 10. This is preferably accomplished by "writing" on the screen 42 of input assembly 20 with the stylus 38. Preferably, the "ENTER A WORD" step 74 includes the recognition of the word by an appropriate word recognition routine. There are a variety of word recognition routines available, and the basic techniques of word recognition are well known to those skilled in the art. Alternatively, the step 74 "ENTER A WORD" can enter a word as ink and can compute the bounding box of the word object by a word segmenting technique such as assuming that a series of ink strokes made within a predetermined time and distance of each other comprise a "word".

Next, in a step 76, the best existing paragraph "BESTPG" to which the newly-entered word may belong is determined. This step 76 will be discussed in greater detail with reference to FIG. 4. Next, in a decision step 78, it is determined whether a best existing paragraph exists, i.e. if BESTPG≠NULL. If BESTPG=NULL, a new paragraph is started with the newly entered word in a step 80. This is easily accomplished by setting the bounding box of the new paragraph equal to the bounding box of the newly entered word. Process control is then returned to step 74. If BESTPG≠NULL, the newly-entered word is added to the best existing paragraph, as stored in the variable BESTPG, in a step 82. Step 82 will be discussed in greater detail with respect to FIG. 5.

Figure 3A:
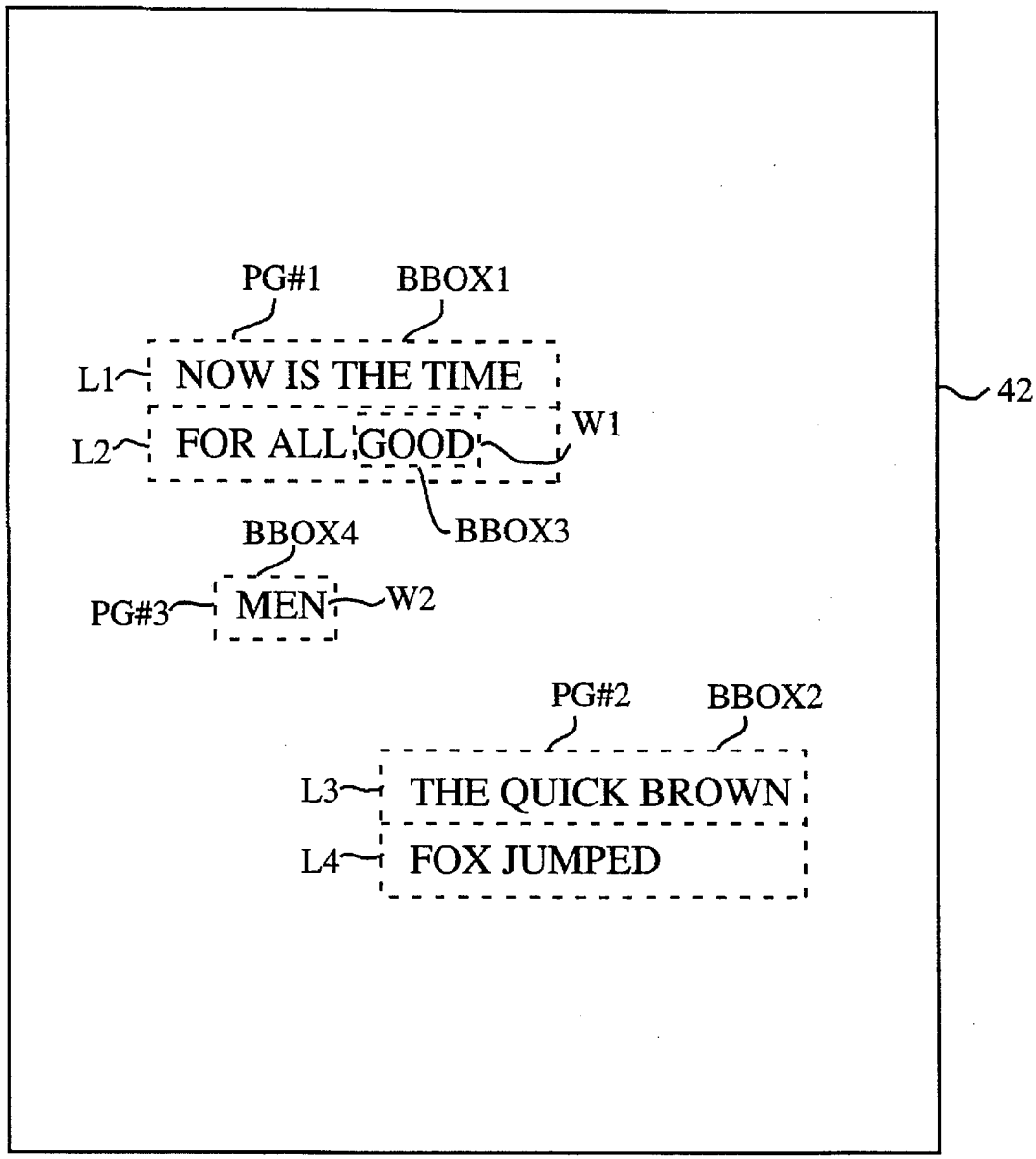
FIG. 3a is an illustration used to explain the process of the present invention.

In FIG. 3a, a portion of screen 42 is shown with various word, line, and paragraph objects. Assume, for the moment, that a first paragraph object PG#1 and a second paragraph object PG#2 were originally displayed on the screen 42. The paragraph PG#1 included the words "NOW IS THE TIME FOR ALL", where the words "NOW IS THE TIME" comprised a first line L1 and the words "FOR ALL" comprised a second line L2 of the paragraph PG#1. In paragraph PG#2, assume that the words "THE QUICK BROWN" comprised a first line L3, and the words "FOX JUMPED" comprised a second line L4.

In the present invention, text objects such as letters, words, sentences, and paragraphs are objects having an associated bounding box (BBOX). A bounding box is an invisible, rectilinear box which is sized to just enclose the object. Therefore, the paragraph PG#1 is enclosed in a first bounding box BBOX1, while the paragraph PG#2 is enclosed in a second bounding box BBOX2. Likewise lines L1–L4 are enclosed in their bounding boxes, as are the individual words within the lines, and the individual letters within the words.

Assume next that the word "GOOD" is then entered onto the screen 42 with stylus 38. This word "GOOD" is shown at W1, and is enclosed within a bounding box BBOX3. As will be discussed in greater detail subsequently, the word W1 is associated with PG#1 and, therefore, will be added to the paragraph PG#1 by the process of the present invention. In contrast, a word W2 "MEN" entered on screen 42 by stylus 38 has a bounding box BBOX4 which does not touch the bounding box BBOX1 of PG#1 nor the bounding box BBOX2 of bounding box PG#2. As will be discussed in greater detail subsequently, this will cause the word "MEN" to form a brand new paragraph PG#3 having the same bounding box BBOX4 as the word W2.

Figure 4:
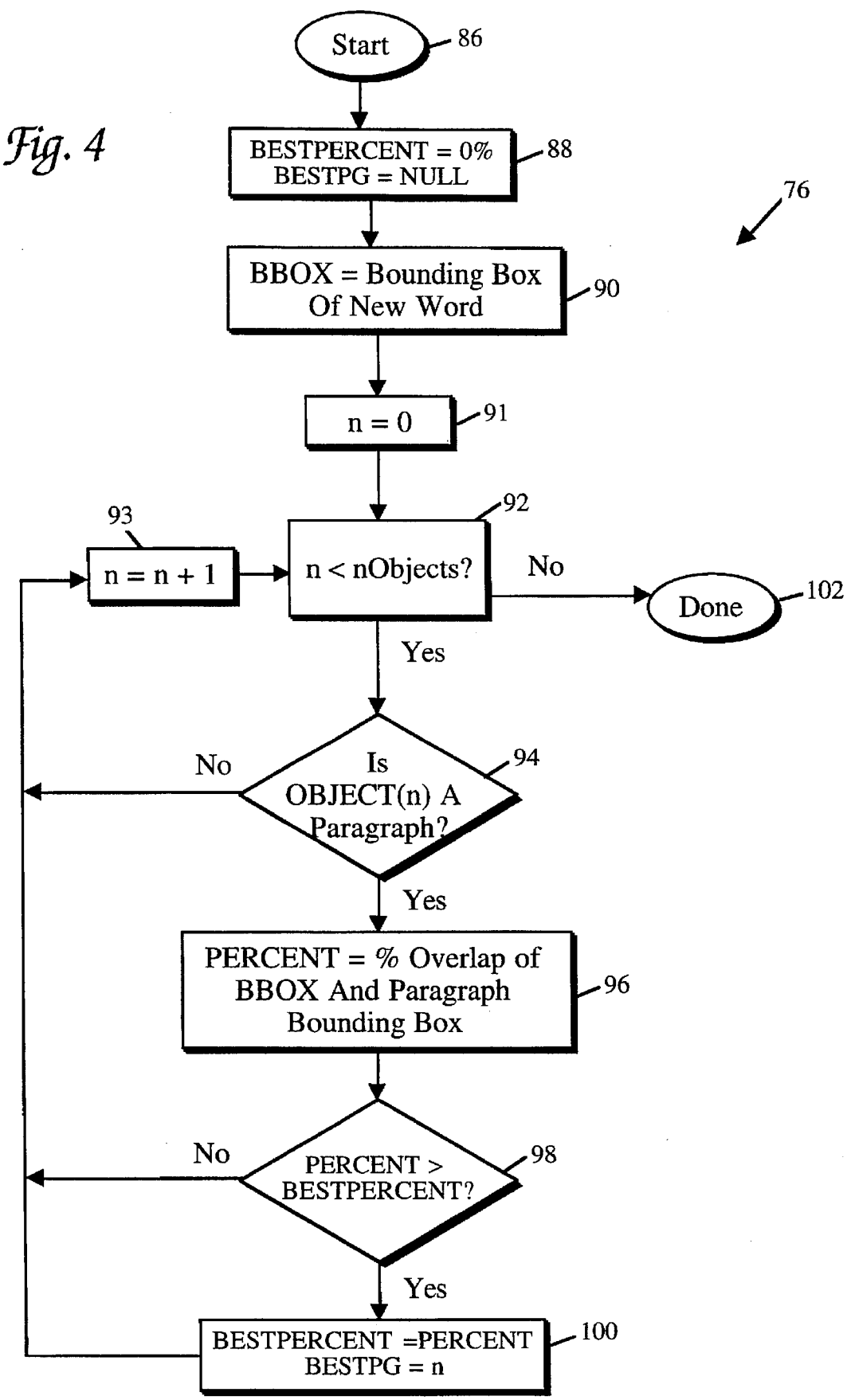
FIG. 4 is a flow diagram illustrating step 76 "FIND BEST EXISTING PARAGRAPH" of FIG. 3 in greater detail.

FIG. 4 will be discussed within the context of the example shown in FIG. 3a. In FIG. 4, a process of step 76 "FIND BEST EXISTING PARAGRAPH" begins at 86 and, in an initialization step 88, the variable BESTPERCENT is set to 0%, and the variable BESTPG is set to NULL. Next, in a step 90, a variable BBOX is set to the bounding box of a new word. In the example of FIG. 3a, the variable BBOX would be assigned the parameters of bounding box BBOX3 of word W1. Next, in a step 91, a variable n is set to zero. In next step 92, n is compared to the number of objects on the screen with the query "n<nObjects?", where nObjects is the number of objects on the screen. If n is less than nObjects, a decision step 94 determines whether OBJECT(n) is a paragraph. In the example of FIG. 3a, there were only two existing paragraph objects on the screen, namely PG#1 paragraph object and PG#2 paragraph object. Therefore, OBJECT(0) is PG#1, and OBJECT(1) is PG#2.

Since OBJECT(0) (i.e. PG#1) is a paragraph type object, a step 96 calculates the percent overlap of BBOX (here BBOX3) with the paragraph bounding box BBOX1. The paragraph bounding box of this invention is provided with a bit of a margin, unlike most bounding boxes which comprise the minimum box which encloses its objects. This margin, which may be about a line spacing in width, is provided fully around the enclosed objects so that the bounding boxes of nearby words will overlap with the paragraph bounding box for inclusion into the paragraph. In this instance, the variable "PERCENT" will be 100%, since BBOX3 is fully enclosed within BBOX1. Next, in a step 98, it is determined whether the variable PERCENT is greater than the variable BESTPERCENT. Since, in this example, PERCENT equals 100% and BESTPERCENT equals 0%, the decision of step 98 is "yes" and, in a step 100, the variable BESTPERCENT is assigned the value of PERCENT and the variable BESTPG is assigned the value n. Process control is returned to step 93 after a negative determination in either of steps 94 and 98, or after the completion of step 100. In step 93, n is incremented, and n is then compared to nObjects again in step 92.

After iterative loop steps 92 and 93 has stepped through all of the objects on the screen, the variable BESTPG will either have the value NULL or a numeric value relating to the best paragraph BESTPG with which to associate the newly-entered word. The process 76 is then completed as indicated at 102.

Figure 5:
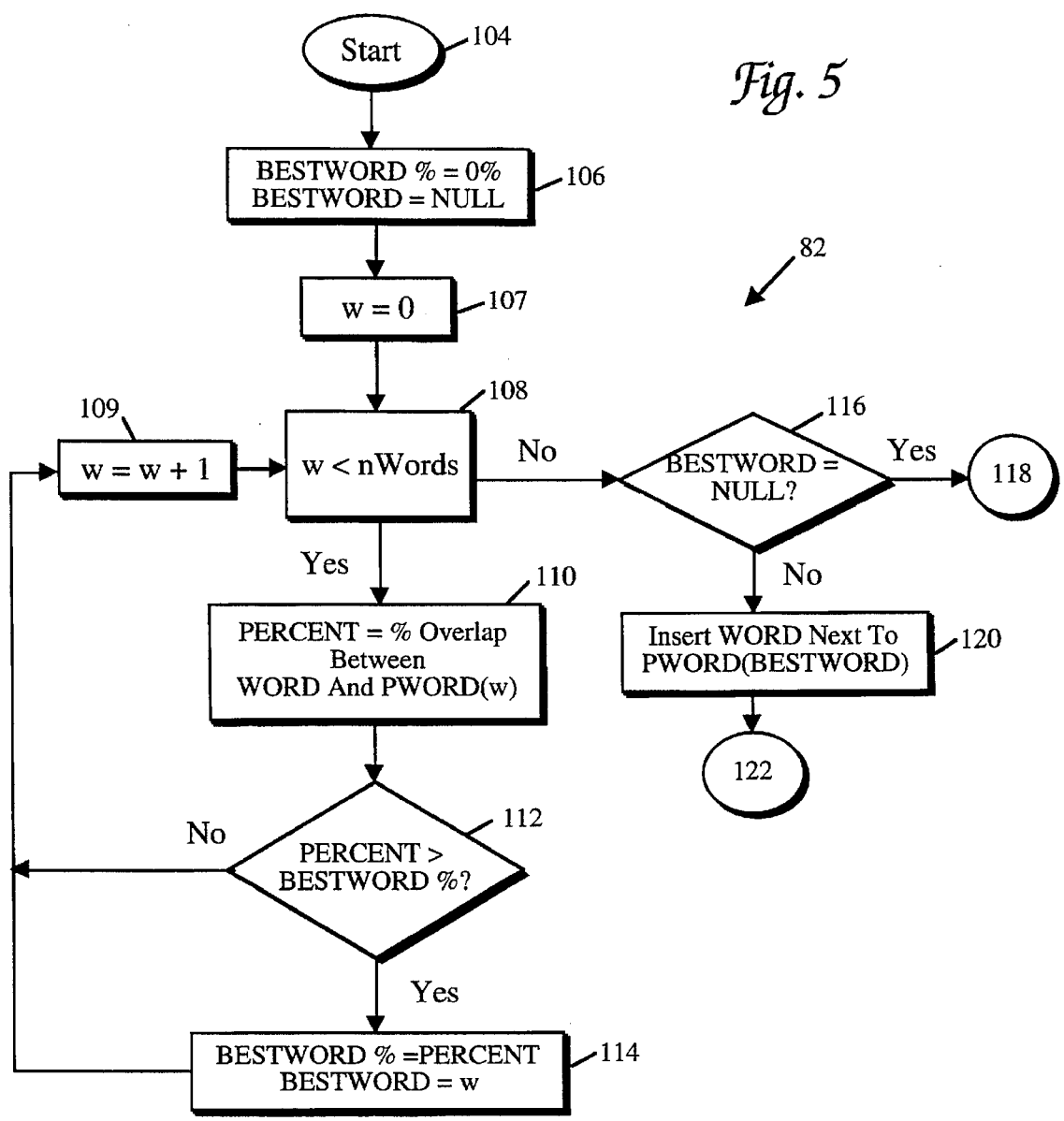
FIG. 5 is a flow diagram illustrating step 82 "ADD WORD TO BESTPG" of FIG. 3 in greater detail.

In FIG. 5, a process step 82 "ADD WORD TO BESTPG" of FIG. 3 is illustrated in greater detail. The process 82 begins at 104, and in an initialization step 106, the variable BESTWORD% is set to 0%, and the variable BESTWORD is set to NULL. Next, in a step 107, a variable w is set to zero. In next step 108, variable w is compared with the variable nWords. The variable "nWords" is the number of words within the paragraph BESTPG. If the variable w is less than the variable nWords, a step 110 sets the value of a variable "PERCENT" to the percent overlap between the newly-entered word and the w word in the paragraph PWORD(w). Next, in a step 112, it is determined if the value of the variable PERCENT is greater than the value of the variable BESTWORD%. If it is, in a step 114 the variable BESTWORD% is assigned the value of PERCENT, and the variable BESTWORD is assigned the value of w. Process control is returned to step 109 upon a negative determination in step 112 and after the completion of step 114. In step 109, w is incremented, and w is then compared to nWords again in step 108.

After completion of the iterative loop steps 108 and 109, i.e. after all of the words of the paragraph have been compared against the newly-entered word, a decision step 116 determines whether the BESTWORD equals NULL. If it does, process control is turned over to point 118 of FIG. 6. If step 116 determines that the BESTWORD≠NULL, a step 120 inserts the word next to PWORD(BESTWORD) of BESTPG. The word is inserted after PWORD (BESTWORD) if the right edge of the word is beyond the right edge of PWORD(BESTWORD). Otherwise, the word is inserted to the left of PWORD(BESTWORD). Process control is then turned over to point 122 on FIG. 6.

Figure 5A:
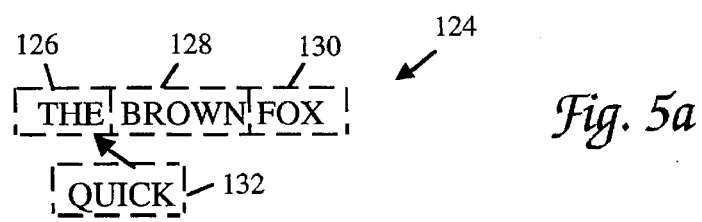
FIG. 5a is an example used to explain the process 82 of FIG. 5.

The process 82 of FIG. 5 will be discussed in greater detail with reference to the example of FIG. 5a. In FIG. 5a, a paragraph 124 has a line "THE BROWN FOX" comprised of three words 126, 128, and 130. A new word 132 is entered on the screen 42 with stylus 38 mostly over the word 126, but also partially over the word 128. The process 82 determines that the BESTWORD=0, i.e. the word 126 "THE", because the word 132 overlaps the word 126 more than it overlaps the word 128. Obviously, in this example, nWords has the value 3. Therefore, after three iterations of the iterative loop step 108, the step 116 determines that the BESTWORD is not equal to a NULL, and the word 132 is inserted after PWORD(BESTWORD)=PWORD(0)= "THE".

Figure 6:
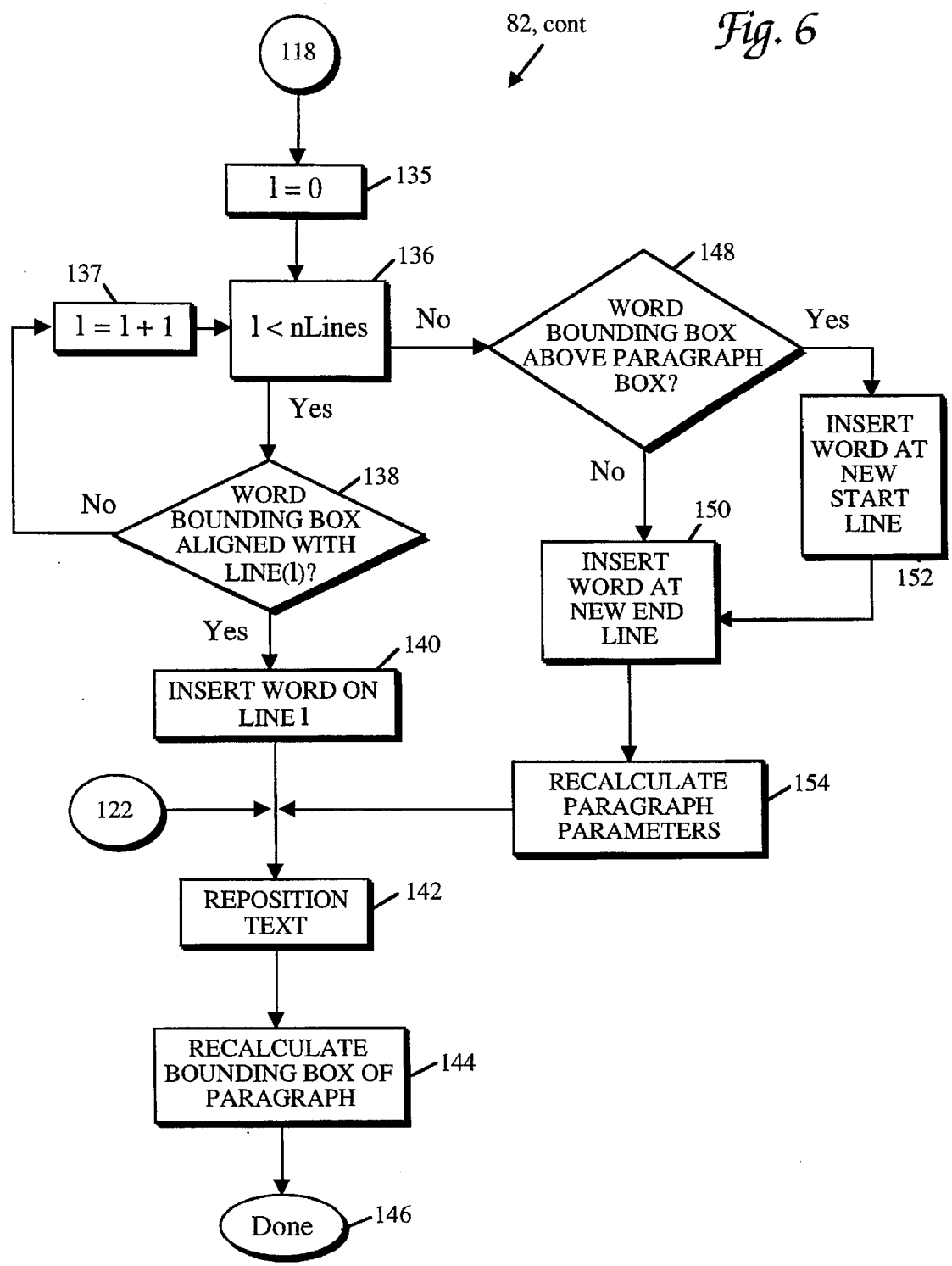
FIG. 6 is a continuation of the flow diagram of FIG. 5.

FIG. 6 is a continuation of the process 82 that was discussed with reference to FIG. 5. The entry points into this process 82, cont. are points 118 and 122. From entry point 118, a step 135 sets a variable l to zero, and next step 136 compares the variable l to the number of lines, nLines, in the paragraph. If l is less than nLines, a step 138 determines whether the newly-entered word's bounding box is aligned with LINE(l). If not, the value l is iterated in a step 137, after which l is again compared to nLines. If the bounding box of the newly-entered word is aligned with LINE(l), a step 140 inserts the newly-entered word into LINE(l). If the newly-entered word lies to the right of LINE(l), it is inserted after the last word on LINE(l). Alternatively, if the newly-entered word lies to the left of LINE(l), it is inserted before the first word of LINE(l). Next, in a step 142, text is repositioned, as appropriate, and a step 144 recalculates the bounding box of the paragraph. The process 82 is then completed as indicated 146.

If the loop comprising steps 135, 136, 137, and 138 determine that the newly-entered word is not aligned with any of the lines of the paragraph, it is then assumed that the word is either immediately above or immediately below the paragraph. A step 148 determines whether the word bounding box is above the paragraph box and if it is, a step 152 inserts the word in a new start line the paragraph. In other words, step 152 creates a new first line for the paragraph and inserts the word into it. If the word is below the paragraph as determined by step 148, a step 150 inserts the word into a new end line. As before, this essentially means that a new last line is added to the paragraph and the newly-entered word is entered into this new last line. Next, in a step 154, the paragraph parameters are recalculated to reflect the addition of the first or last line, as detailed in FIG. 8. Steps 142 and 146 are then repeated, and the process is completed as indicated at 146. Steps 142 and 144 are also processed after step 120 of FIG. 5, as indicated by the entry point 122.

Figure 7:
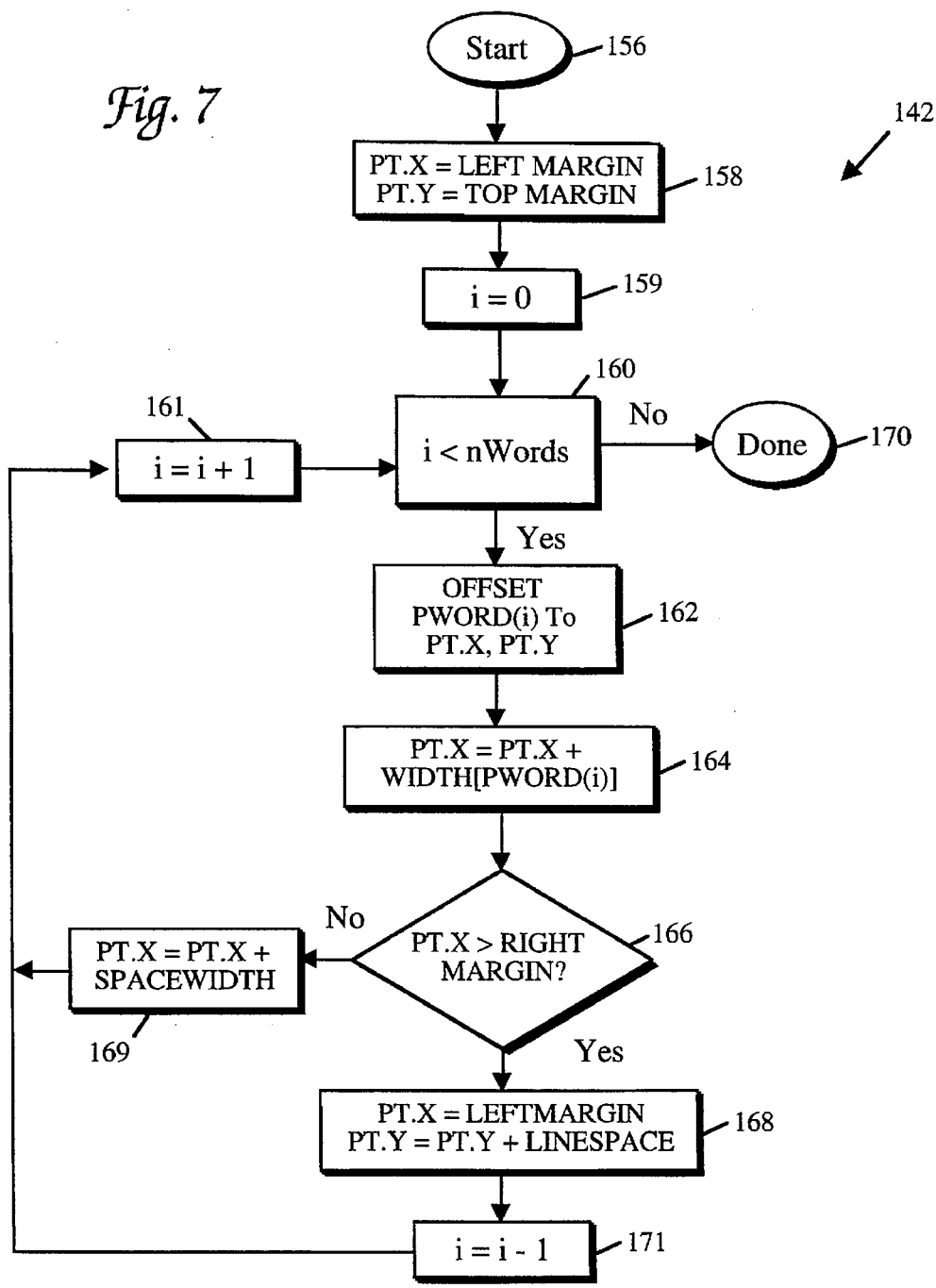
FIG. 7 is a flow diagram illustrating step 142 "REPOSITION TEXT" of FIG. 6 in greater detail.

In FIG. 7, the step 142 "REPOSITION TEXT" of FIG. 6 is discussed in greater detail. Process 142 begins at 156 and, in a step 158, initializes the variable PT.X to the value of LEFTMARGIN and the variable PT.Y to the value TOPMARGIN. These are the current left and top margins, respectively, of the paragraph. Next, in a step 159, a variable w is set to zero, and in next step 160, w is compared to the number of words in the paragraph nWords. If w is less than nWords, a step 162 offsets paragraph word #w (i.e. PWORD (w)) to the point PT.X, PT.Y. Next, in a step 164, the variable PT.X is updated to the value of PT.X plus the width of PWORD(w). If, on step 166, PT.X is greater than RIGHTMARGIN (the current value of the right margin of the paragraph bounding box) the variable PT.X is set to the value of LEFTMARGIN and the variable PT.Y is set to the value of PT.Y plus LINESPACE (the preferred line spacing) in a step 168. This step 168 essentially performs a "carriage return" function so that the next word in the paragraph is displayed at the first position of the next line of the paragraph. After step 168, process control is then returned to a step 161 to increment variable v before comparing w to nWords in step 160. If, in step 166, PT.X is less than RIGHTMARGIN, a variable SPACEWIDTH, which is equal to the preferred spacing, is added to PT.X in step 169 before the process returns to step 161. After all of the words in the paragraph have been "reflowed" in this manner to fit between the LEFTMARGIN and RIGHTMARGIN of the paragraph, the process is completed as indicated at 170.

Figure 7A:
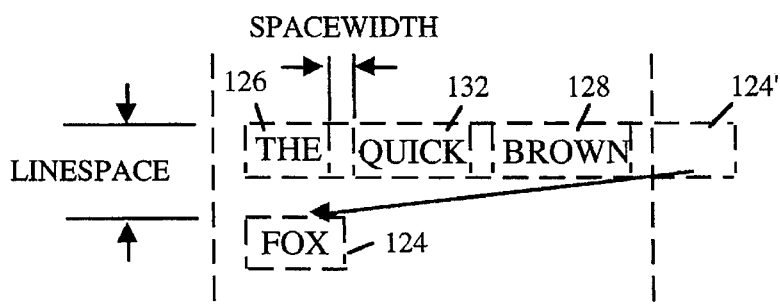
FIG. 7a is an illustration of an example used to explain step 142.

This process 142 will be discussed in terms of an example with reference to FIG. 7a. In FIG. 7a, the word 132 "QUICK" has been inserted between the words 126 and 128. However, the insertion of the word 132 causes the word 124 "FOX" to be moved to the next line of the paragraph because it overlaps the RIGHTMARGIN as illustrated at 124'. This "reflowing" process is continued for all of the words in the paragraph after the insertion of a new word.

Figure 8:
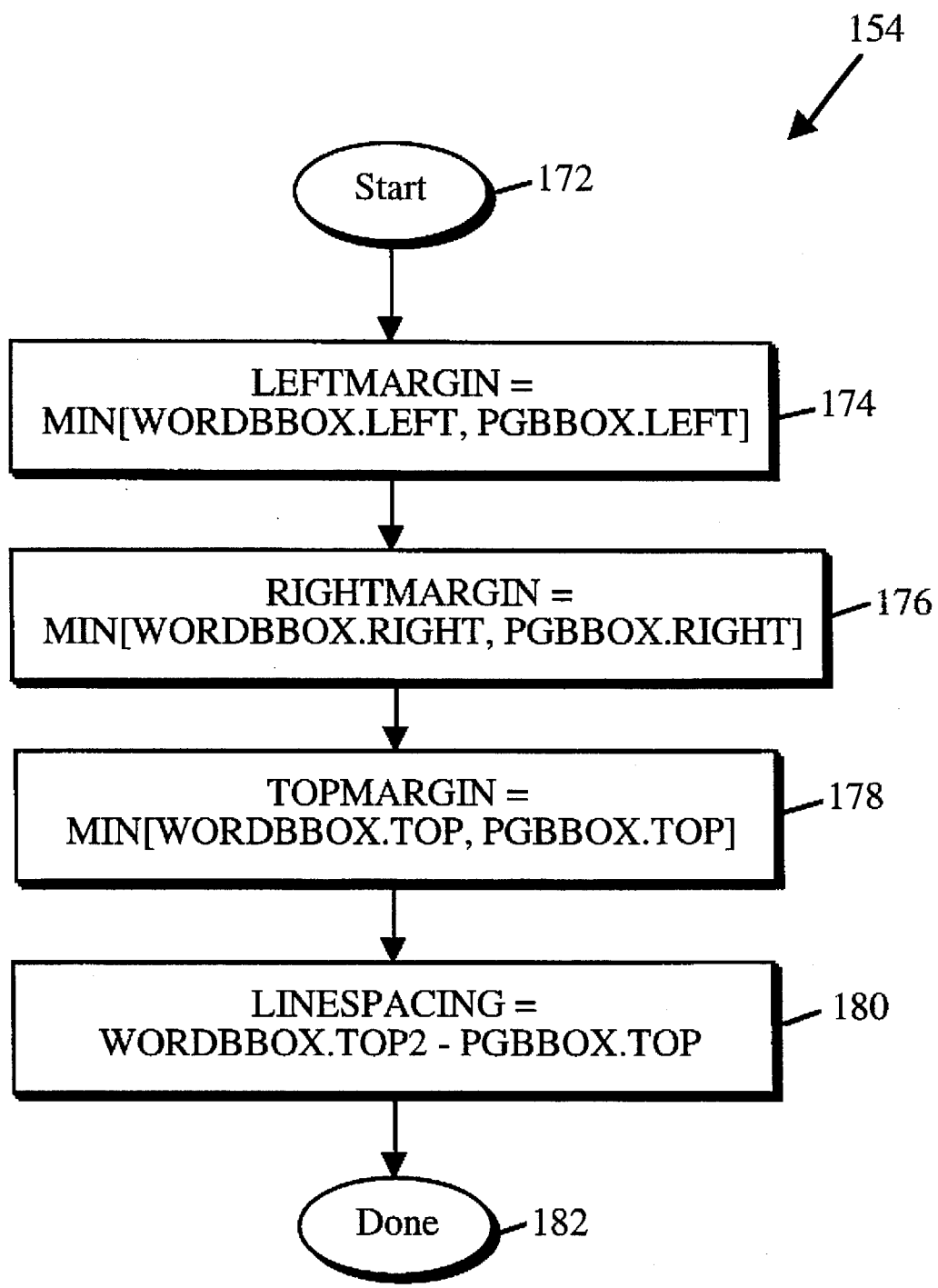
FIG. 8 is a flow diagram illustrating step 154 "RECALCULATE PARAGRAPH PARAMETERS" of FIG. 6 in greater detail.

In FIG. 8, step 154 "RECALCULATE PARAGRAPH PARAMETERS" of FIG. 6 is shown in greater detail. Process 154 begins at 172 and, in a first step 174, the variable LEFTMARGIN is calculated. As discussed previously, the pixels of the screen 42 are preferably arranged in an (x,y) coordinate system where the X values are along a horizontal axis and the Y values are along the vertical axis. Therefore, LEFTMARGIN will be the minimum X value of the paragraph in question. The process 174 compares the left-hand edge of the bounding box for the leftmost word in the paragraph (WORDBBOX.LEFT) with the lefthand edge of the paragraph bounding box (PGBBOX.LEFT). The minimum value between these two is assigned as the value of LEFTMARGIN. Similarly, in a step 176, the value of RIGHTMARGIN is set to be the maximum of the right-most edge of the bounding box for the right-most word in the paragraph (WORDBBOX.RIGHT) and the right-most edge of the paragraph bounding box (PGBBOX.RIGHT).

For convenience, in our coordinate system, the value of X increases from left to right across the screen 42, while the value of Y increases from top to bottom. Again, units in the coordinate system are preferably pixels of the screen 42. Therefore, in a step 178, the value of TOPMARGIN is assigned the minimum Y value of the top value of the bounding box of the topmost word (WORDBBOX.TOP) and the top Y value of the paragraph bounding box PGBBOX.TOP. Finally, in a step 180, the line spacing, as stored in the variable "LINESPACING", for a word entered above the paragraph is equal to the Y value of the top of the bounding box of the word in the second line of the paragraph, WORDBBOX.TOP2, minus the Y value of the top of the bounding box of the paragraph PGBBOX.TOP.

Alternatively, for a word entered below the paragraph, the line spacing is equal to the Y value of the bottom of the word bounding box minus the Y value of the bottom of the paragraph bounding box. The process is then completed as indicated at 182.

Referring again briefly to FIG. 6, after the step 154 is completed, the steps 142 and 144 are repeated, because it is possible that the length of the new word exceeds the current width of the paragraph, thus triggering a "reflowing" of the words of the paragraph in step 142 and a recalculation of the bounding box after reflow in a step 144.

Figure 9:
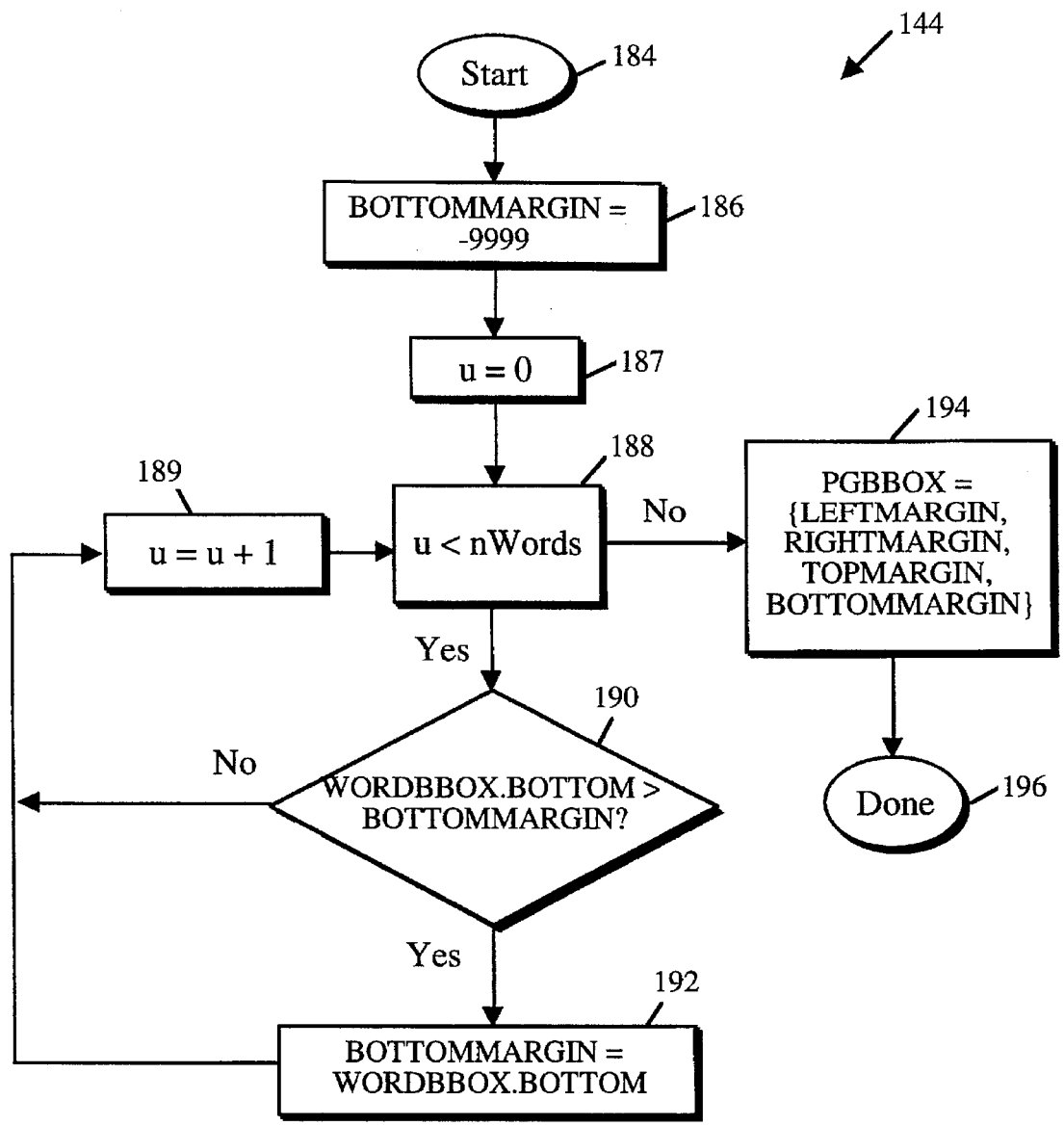
FIG. 9 is a flow diagram illustrating step 144 "RECALCULATE BOUNDING BOX" of FIG. 6 in greater detail.

In FIG. 9, step 144 of FIG. 6 is illustrated in greater detail. The process 144 begins at 184 and, in a step 186, the variable BOTTOMMARGIN is set to an arbitrarily small number such as −9999. Next, in a step 187, the variable u is set to zero, and, in next step 188, u is compared to the number of words in the paragraph nWords. If u is less than nWords, a decision step 190 compares the bottom of the word bounding box WORDBBOX.BOTTOM with the value of BOTTOMMARGIN. If WORDBBOX.BOTTOM is greater than BOTTOMMARGIN, then step 192 assigns the value of WORDBBOX.BOTTOM to the variable BOTTOMMARGIN. If the decision step 190 is in the negative, the process control is returned to a step 189, as it is after the completion of step 192. Variable u is incremented in step 189 prior to the process returning to step 188. After all nWords have been compared, the iterative process step 188 is completed and a step 194 resets the parameters of the bounding box PGRBOX for the paragraph to TOPMARGIN, BOTTOMMARGIN, LEFTMARGIN, and RIGHTMARGIN. The variables TOPMARGIN, LEFTMARGIN, AND RIGHTMARGIN are calculated as previously described by process 154 or as set up originally within the paragraph bounding box, while BOTTOMMARGIN is calculated by this process 144. The process is then complete at 196.

Figure 10:
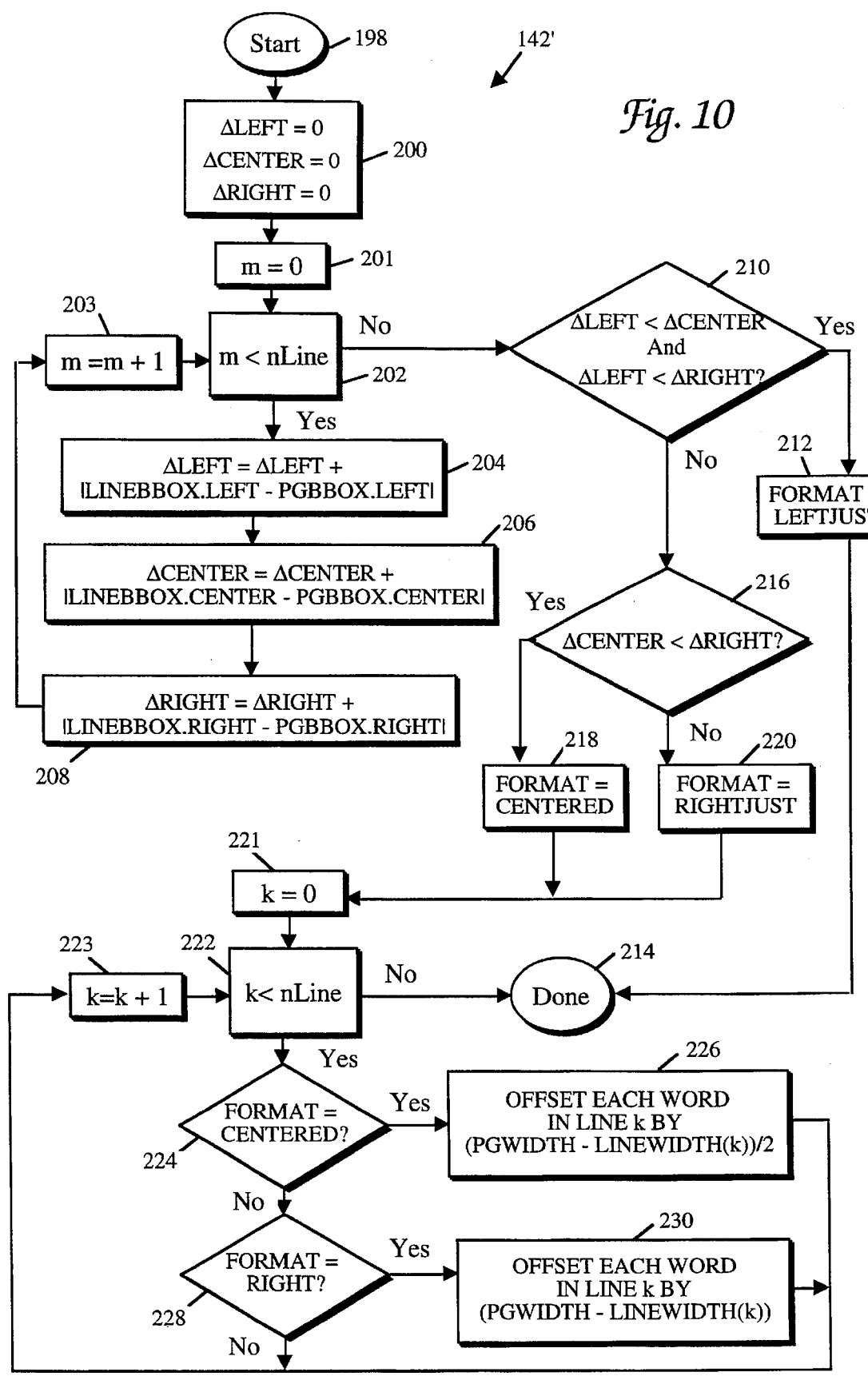
FIG. 10 is a flow diagram illustrating an alternative embodiment 142' of step 142 "REPOSITION TEXT" of FIG. 6.

FIG. 10 illustrates an alternate embodiment of the present invention wherein special formatting of a paragraph is recognized and implemented rather than the reflowing of the text within the paragraph, as described previously. This alternate embodiment is essentially a replacement for the "REPOSITION TEXT STEP" 142 described previously. This process will therefore be described as alternative step or process 142'.

The process 142' begins at 198 and, in a step 200, the variable ΔLEFT is set to 0, the variable ΔCENTER is set to 0, and the variable ΔRIGHT is set to 0. Next, in a step 201, the variable m is set to zero, and, in next step 202, m is compared to the number of lines in the paragraph nLine. If m is less than nLine, a step 204 assigns to the variable ΔLEFT the value of ΔLEFT plus the absolute value of the difference between LINEBBOX.LEFT−PGBBOX.LEFT, corresponding to the left-most line bounding box edge and the leftmost edge of the paragraph box, respectively. Next, in a step 206, the value ΔCENTER is assigned the value of ΔCENTER plus the absolute value of the difference between LINEBBOX.CENTER and PGBBOX.CENTER, corresponding to the center of the line bounding box and the center of the paragraph bounding box, respectively. Finally, in a step 208, the value of ΔRIGHT is updated to the value of ΔRIGHT plus the absolute value of the difference between LINEBBOX.RIGHT and PGBBOX.RIGHT, corresponding to the right-most line bounding box edge and the right-most paragraph bounding box edge, respectively. After step 208, a step 203 increments variable m before returning to step 202 to compare m to nLine.

The essential result of the loop comprising steps 202–208 is to provide values for the three variables ΔLEFT, ΔCENTER, and ΔRIGHT which reflect whether the lines in the paragraph are mostly left-justified, mostly right-justified, or mostly centered. The least value of these variables indicates the particular format most likely intended for the lines.

After the completion of the iterative loop step 202, a decision step 210 determines whether ΔLEFT is less than ΔCENTER and less than ΔRIGHT. If it is, then the lines of the paragraph are left-justified, which is the default justification, and in a step 212, the variable FORMAT is set to LEFTJUST. The process is completed as indicated at 214. If the decision step 210 is decided in the negative, a step 216 determines whether ΔCENTER is less than ΔRIGHT. If it is, then the variable FORMAT is set to the value CENTERED in a step 218. If the decision step 216 is in the negative, the variable FORMAT is set to RIGHTJUST in a step 220.

After the completion of steps 218 or 220, a step 221 initializes the variable k to 0, and a next step 222 compares k to the number of lines in the paragraph (nLines). In a step 224, it is determined whether the variable FORMAT has the value CENTERED, and if it does, a step 226 offsets each word in the line k horizontally from a left-justified position towards the right margin by one-half of the difference between the paragraph width (PGWIDTH) and the line width (LINEWIDTH(k)). If step 228 determines that the FORMAT is equal to RIGHT, a step 230 will offset each word in the line k horizontally from a left-justified position towards the right margin by the difference between the paragraph width and the line width, i.e. PGWIDTH minus LINEWIDTH(k). After the completion of steps 230 and 226, and if the FORMAT is not equal to RIGHT, process control returns to step 223, where variable k is incremented before it is again compared to nLines in step 222. After all nLines have been formatted, the process is completed as indicated at 214.

Figure 10A:
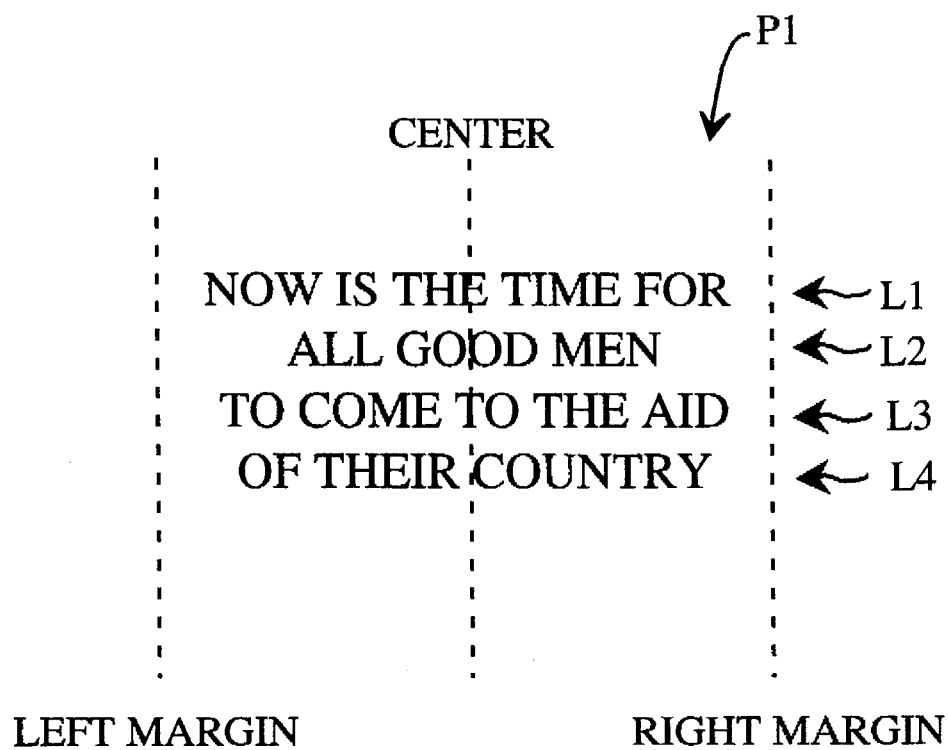
FIG. 10a is an illustration used to describe an example of process 142'.

The process 142' will be discussed in greater detail with regard to the example of FIG. 10a. In this example, a paragraph P1 is comprised of four lines L1, L2, L3, L4. All of the lines L1–L4 are between the LEFTMARGIN and RIGHTMARGIN of paragraph P1. It is also apparent that the lines L1–L4 have been roughly centered around a centerline CENTER of the paragraph P1. In this instance, the loop 202–208 of FIG. 10 would produce a ΔCENTER which is less than ΔLEFT or ΔRIGHT, i.e. ΔCENTER would be a smaller numerical value than ΔLEFT or ΔRIGHT. Step 218 of FIG. 10 would therefore set the variable FORMAT to the value CENTERED. Finally, since the format is "centered", step 226 will offset each word in each line L1–L4 by one half of the difference between the paragraph width and the line width, from a left-justified position thereby centering the lines around the centerline CENTER of the paragraph P1.

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceding specification. In particular, the described frame database system is preferred for simplifying the programming tasks required by the computer implemented processes of the present invention, but there are many other database and graphics systems which can be used to accomplish same task.

It is therefore intended that the following appended be interpreted as including all such alterations, permutations, and equivalents as fall within the true spirit and scope of the present invention.

What is claimed is:

1. A method for formatting paragraphs on a screen of a computer system comprising the steps of:

entering a word on a screen of a computer system using a pointing device of said computer system;

conducting an automatic search for a paragraph that the word can be associated with, said automatic search being conducted without receiving an explicit command to associate said word with a paragraph, and designating a paragraph to be an associated paragraph of the word if the word meets a criteria for inclusion in said associated paragraph; and adding the word to said associated paragraph, if one was found by said automatic search.

2. A method as recited in claim 1 wherein said criteria for inclusion includes the step of determining whether said word contacts an existing paragraph on said screen.

3. A method as recited in claim 2 wherein said step of determining whether said word contacts an existing paragraph on said screen comprises the step of comparing the amount of overlap of a bounding box of said word with the bounding boxes of existing paragraphs on said screen.

4. A method as recited in claim 1 wherein said step of adding the word to an associated paragraph comprises the steps of:

determining whether said word overlaps an existing word of said associated paragraph; and adding said word next to said existing word.

5. A method as recited in claim 1 wherein said step of adding a word to an associated paragraph comprises the steps of:

determining whether said word is aligned with an existing line of said associated paragraph; and adding said word to said existing line if it is aligned with said existing line.

6. A method as recited in claim 1 wherein said step of adding a word to an associated paragraph comprises the steps of:

determining whether said word is above said associated paragraph;

forming a new first line for said associated paragraph; and adding said word to said new first line.

7. A method as recited in claim 1 wherein said step of adding a word to an associated paragraph comprises the steps of:

determining whether said word is below said associated paragraph;

forming a new last line for said associated paragraph; and adding said word to said new last line.

8. A method as recited in claim 1 wherein said step of adding a word to said associated paragraph comprises the step of:

repositioning text within said associated paragraph after said word is added.

9. A method as recited in claim 8 wherein said step of repositioning text comprises the step of:

reflowing words within said associated paragraph in accordance with a left margin and a right margin of said associated paragraph.

10. A method as recited in claim 8 wherein said step of repositioning text comprises the steps of:

recognizing a format type by examining a plurality of lines of said associated paragraph;

and aligning said plurality of lines in accordance with said format type.

11. A method as recited in claim 10 wherein said format type is selected from the group of left-justified, right-justified, and centered.

12. A method for displaying text in a pen-based computer system comprising the steps of:

entering a word comprising at least one character into a pen-based computer system by a stylus;

displaying said word on a screen of said computer system;

automatically incorporating said word into an associated paragraph if said word is contacting or is closely proximate said associated paragraph, wherein said word is incorporated into said paragraph without receiving an explicit command to incorporate said word.

13. A method for displaying text as recited in claim 12 further comprising the step of:

reflowing a plurality of words of said associated paragraph to fit within a left margin and a right margin of said paragraph after said step of incorporating said word into said paragraph.

14. A method for displaying text as recited in claim 12 further comprising the step of:

formatting a plurality of lines of said associated paragraph such that said plurality of lines are either left-justified, right-justified, or centered after said step of incorporating said word into said paragraph.

15. A method for displaying text as recited in claim 12 wherein said step of incorporating said word comprises inserting said word between two existing words of said associated paragraph.

16. A method for displaying text as recited in claim 12 wherein said step of incorporating said word comprises adding said word to an end of a line of said paragraph.

17. A method for displaying text as recited in claim 12 wherein said step of incorporating said word comprises adding a new line to said paragraph.

18. A method for displaying text as recited in claim 17 wherein said new line is added to one of the top and the bottom of said paragraph.

19. A pen-based word processing system comprising:

a CPU;

screen means coupled to said CPU;

tablet means coupled to said CPU for receiving at least one stroke from a stylus means;

means for displaying said at least one stroke from said stylus on said screen means;

means for interpreting said at least one stroke as a word comprising at least one character;

means for determining whether said word belongs with an associated paragraph displayed on said screen means; and means for adding said word to said associated paragraph.

20. A pen-based word processing system as recited in claim 19 further comprising:

means for creating a new paragraph with said word if said word does not belong to an associated paragraph.

21. A pen-based word processing system as recited in claim 19 further comprising:

means for reflowing words of said associated paragraph between a left margin and a right margin after said word is added to said associated paragraph.

22. A pen-based word processing system as recited in claim 19 further comprising:

means for formatting a plurality of lines of said associated paragraph such that said plurality of lines are either left-justified, right-justified, or centered after said word is added to said paragraph.

23. A method for formatting paragraphs on a screen of a computer system comprising the steps of:

entering a word on a screen of a computer system using a pointing device of said computer system;

conducting an automatic search for a existing paragraph that the word can be associated with, said automatic search being conducted without receiving an explicit command to associate said word with a paragraph, and designating a paragraph to be an associated paragraph of the word if the word meets a criteria for inclusion in said associated paragraph; and adding the word to said associated paragraph, if one was found by said automatic search, wherein said word can be added to any position within said associated paragraph as indicated by a position of said word relative to said associated paragraph.

24. A method as recited in claim 23, wherein adding said word includes adding said word at a position in said paragraph based on overlap of said entered word with an existing word of said paragraph.

25. A method as recited in claim 24 wherein said entered word is added to said paragraph at a position after said existing word in said paragraph when a right edge of said entered word is to the right of said overlapped word.

26. A method as recited in claim 25 wherein said entered word is added to said paragraph at a position before said existing word in said paragraph when a right edge of said entered word in said is not to the right of said overlapped word.

* * * * *